United States Patent
Robertson et al.

(10) Patent No.: US 6,666,477 B1
(45) Date of Patent: Dec. 23, 2003

(54) INFLATABLE RESTRAINT SYSTEM AND METHOD

(75) Inventors: James M. Robertson, Spartanburg, SC (US); Leigh A. Robertson, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/645,716

(22) Filed: Aug. 24, 2000

Related U.S. Application Data

(60) Provisional application No. 60/150,726, filed on Aug. 25, 1999.

(51) Int. Cl.$^7$ .............................................. B60R 21/16
(52) U.S. Cl. ................................. 280/743.1; 280/728.1; 280/730.2
(58) Field of Search ........................... 280/743.1, 728.1, 280/732, 730.2

(56) References Cited

U.S. PATENT DOCUMENTS

| | | | |
|---|---|---|---|
| 3,792,873 A | 2/1974 | Buchner et al. | 280/150 AB |
| 4,235,453 A | * 11/1980 | Lawson et al. | 280/743 |
| 4,921,735 A | 5/1990 | Bloch | 482/34.9 |
| 4,944,529 A | 7/1990 | Backhaus | 280/743 |
| 5,087,071 A | 2/1992 | Wallner et al. | 280/743 |
| 5,093,163 A | 3/1992 | Krummheuer et al. | 428/35.1 |
| 5,110,666 A | 5/1992 | Manzel et al. | 428/196 |
| 5,236,775 A | 8/1993 | Swoboda et al. | 428/225 |
| 5,277,230 A | 1/1994 | Sollars, Jr. | 139/389 |
| 5,310,216 A | 5/1994 | Wehner et al. | 280/743 R |
| 5,316,337 A | 5/1994 | Yamaji et al. | 280/743 R |
| 5,356,680 A | 10/1994 | Krummheuer et al. | 428/36.1 |
| 5,365,651 A | 11/1994 | Rogers et al. | 29/468 |
| 5,405,164 A | 4/1995 | Paxton et al. | 280/728 A |
| 5,407,223 A | 4/1995 | Lauritzen et al. | 280/728 A |
| 5,423,273 A | 6/1995 | Hawthorn et al. | 112/441 |
| 5,454,587 A | 10/1995 | Halford et al. | 280/728.1 |
| 5,454,594 A | 10/1995 | Krickl | 280/743.1 |
| 5,458,364 A | 10/1995 | Mueller et al. | 280/728.2 |

(List continued on next page.)

*Primary Examiner*—Jack Lavinder
*Assistant Examiner*—Mariano Sy
(74) *Attorney, Agent, or Firm*—Terry T. Moyer; John E. Vick, Jr.

(57) ABSTRACT

In accordance with one aspect of the present invention, an inflatable restraint system for use in a transportation vehicle having a dash panel and space for an operator and a passenger is provided. The restraint system includes at least one gas generator housed within the dash panel and an inflatable cushion in fluid communication with the gas generator. The inflatable cushion which may be formed from a single blank of material includes an impact portion for contact with the passenger during a frontal collision and a neck portion which extends away from the impact portion towards the gas generator. The impact portion of the inflatable cushion has a seam free contact surface for contact with the passenger during a collision event and a rear surface which opposes the dash panel upon inflation. The impact portion and the neck portion are adjoined and enclosed by a plurality of substantially straight seams. The inflatable protective cushion is characterized by a substantially arcuate inflated profile such that the impact portion of the cushion extends in curved relation at least partially around the dash panel during a collision event. The inflatable protective cushion is formed from one or more precut panels of fabric or other base material which panels have geometric configurations such that the precut panels may be cut according to a repeating pattern from a roll of fabric or other base material in a close packed orientation substantially with minimal waste across the interior of such roll of fabric. The inflatable protective cushion being further characterized by a low structural seam assembly time.

15 Claims, 16 Drawing Sheets

U.S. PATENT DOCUMENTS

| | | |
|---|---|---|
| 5,477,890 A | 12/1995 | Krummheuer et al. .. 139/291 R |
| 5,498,024 A | 3/1996 | Caruso, Jr. ............... 280/728.2 |
| 5,503,197 A | 4/1996 | Bower et al. ............ 139/435.1 |
| 5,508,073 A | 4/1996 | Krummheuer et al. ..... 428/35.1 |
| 5,520,414 A | 5/1996 | Bishop .................... 280/743.1 |
| 5,529,340 A * | 6/1996 | Fairbanks ................ 280/743.1 |
| 5,531,477 A * | 7/1996 | Madrigal et al. ........ 280/743.1 |
| 5,533,755 A | 7/1996 | Nelsen et al. ............ 280/743.1 |
| 5,544,911 A | 8/1996 | Vine ....................... 280/728.2 |
| 5,547,212 A | 8/1996 | Dyer et al. .............. 280/728.2 |
| 5,553,886 A | 9/1996 | Gunn et al. ............. 280/728.2 |
| 5,564,738 A | 10/1996 | Johnson ..................... 280/736 |
| 5,564,739 A | 10/1996 | Davidson ................... 280/736 |
| 5,566,973 A | 10/1996 | Green et al. ............ 280/728.2 |
| 5,615,915 A * | 4/1997 | Magoteaux ............. 280/743.1 |
| 5,620,200 A | 4/1997 | Garner et al. ........... 280/728.2 |
| 5,652,389 A | 7/1997 | Schaps et al. ................ 73/643 |
| 5,671,935 A * | 9/1997 | Berger et al. ............ 280/243.1 |
| 5,683,100 A | 11/1997 | Enders .................... 280/728.2 |
| 5,692,777 A | 12/1997 | Tochacek et al. ........ 280/743.1 |
| 5,704,402 A | 1/1998 | Bowen et al. ............... 139/289 |
| 5,709,405 A | 1/1998 | Saderholm et al. .......... 280/736 |
| 5,794,974 A * | 8/1998 | Niederman et al. ...... 280/743.1 |
| 5,823,567 A * | 10/1998 | Behr et al. ............... 280/743.1 |
| 5,855,393 A * | 1/1999 | Keshavaraj ............. 280/743.1 |
| 6,086,095 A * | 7/2000 | Keshavaraj ............. 280/743.1 |
| 6,180,204 B1 * | 1/2001 | Keshavaraj ............. 280/728.1 |

* cited by examiner

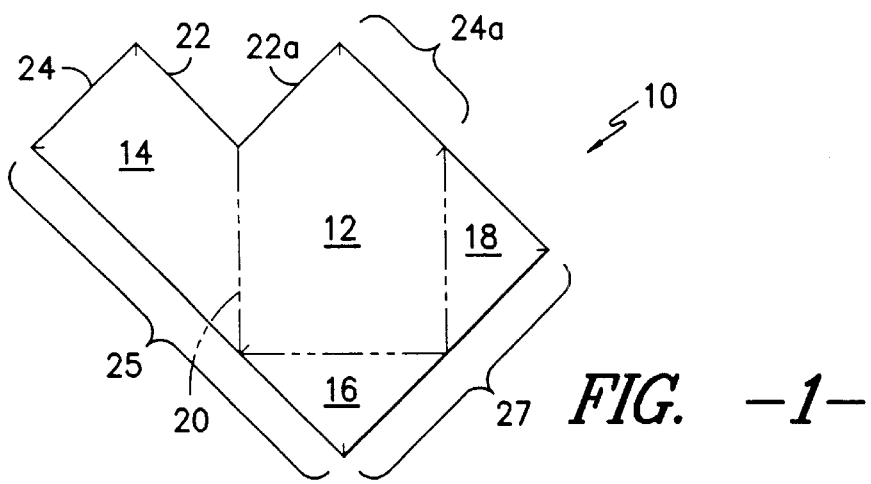
FIG. -1-
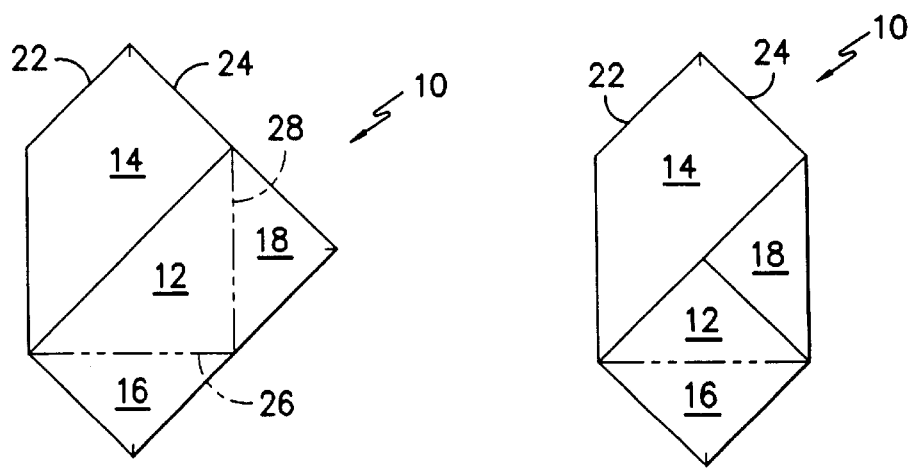
FIG. -2-   FIG. -3-
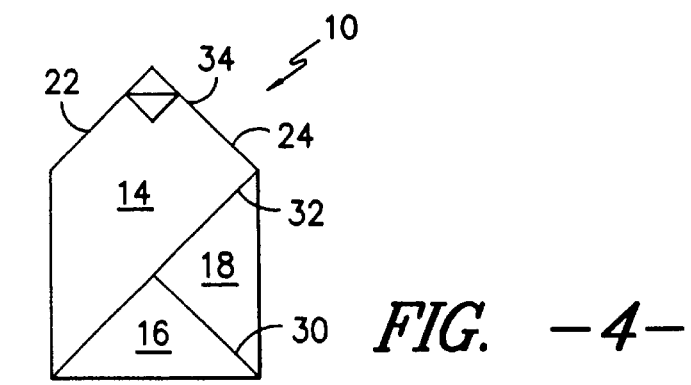
FIG. -4-

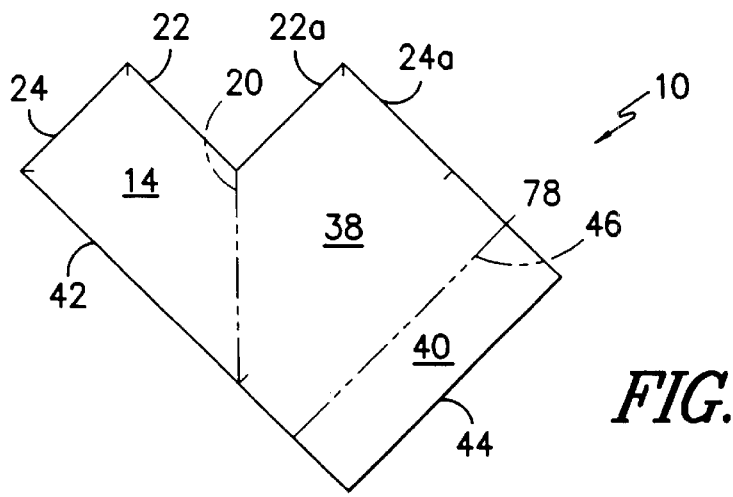
FIG. -5-
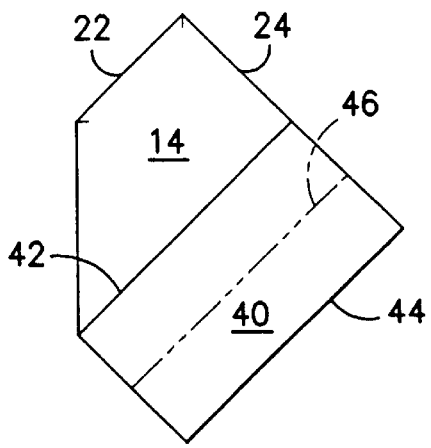
FIG. -6-
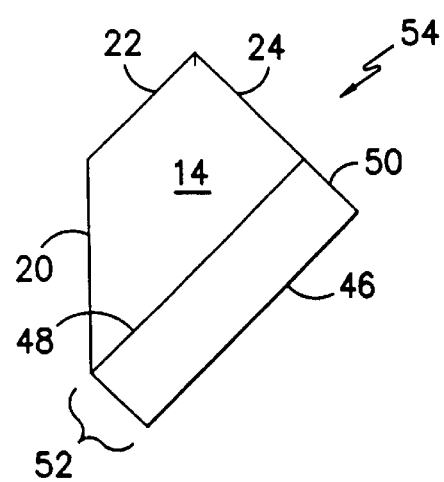
FIG. -7-

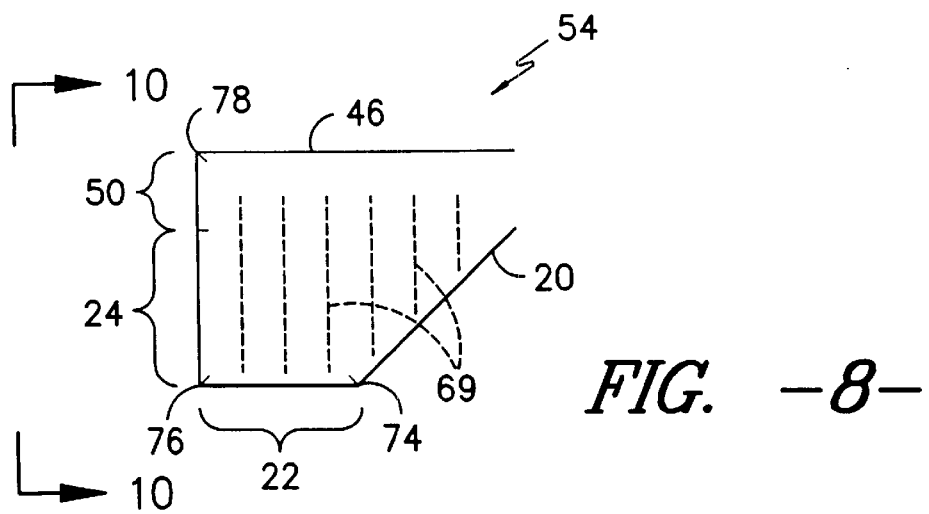
FIG. -8-
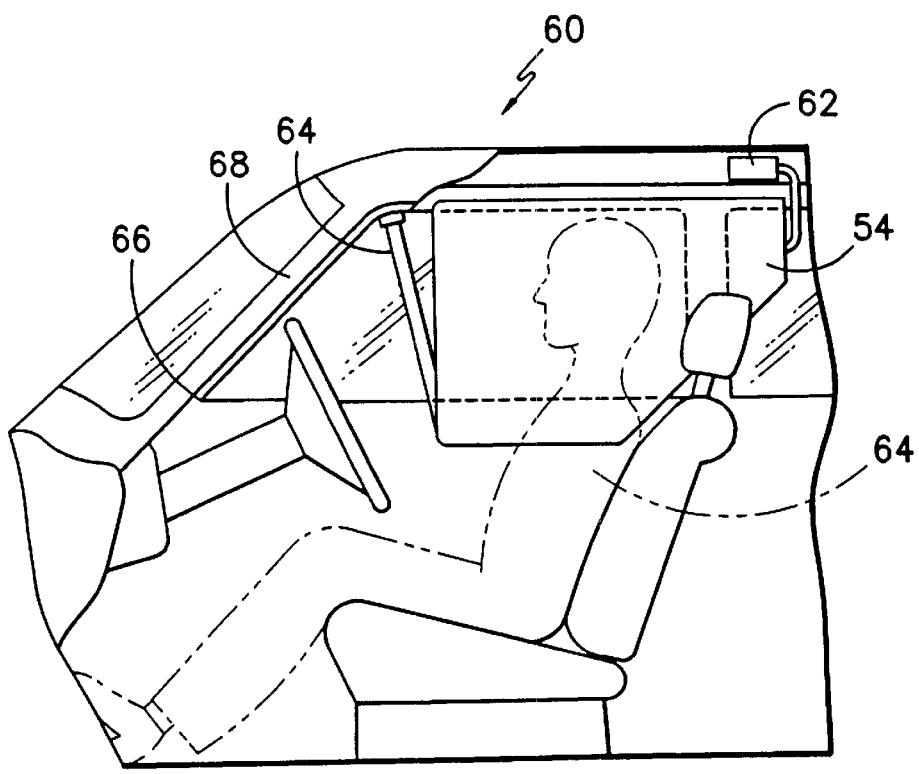
FIG. -9-

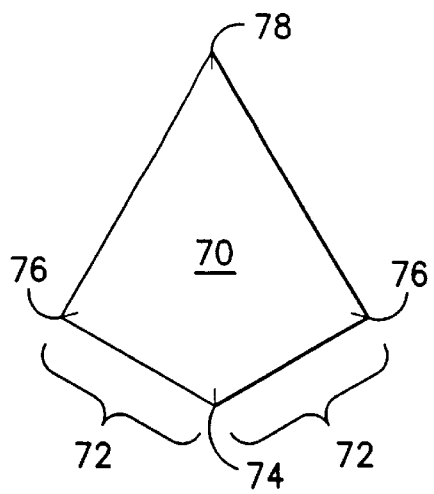
FIG. -10A-
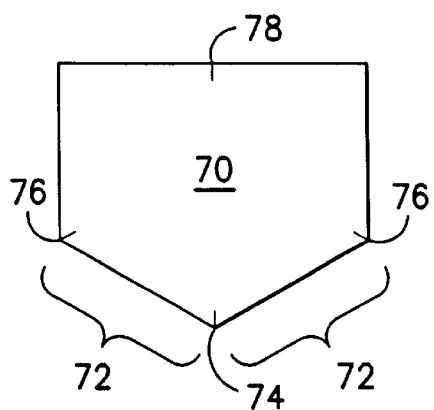
FIG. -10B-
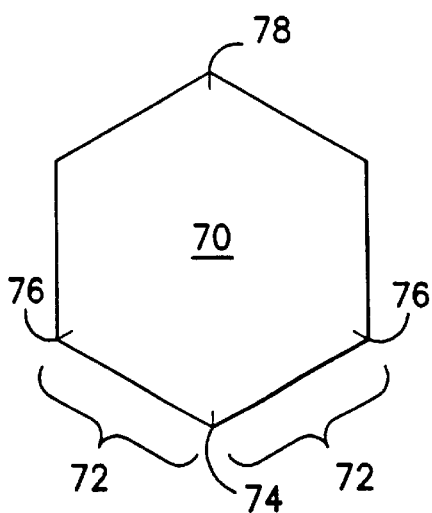
FIG. -10C-

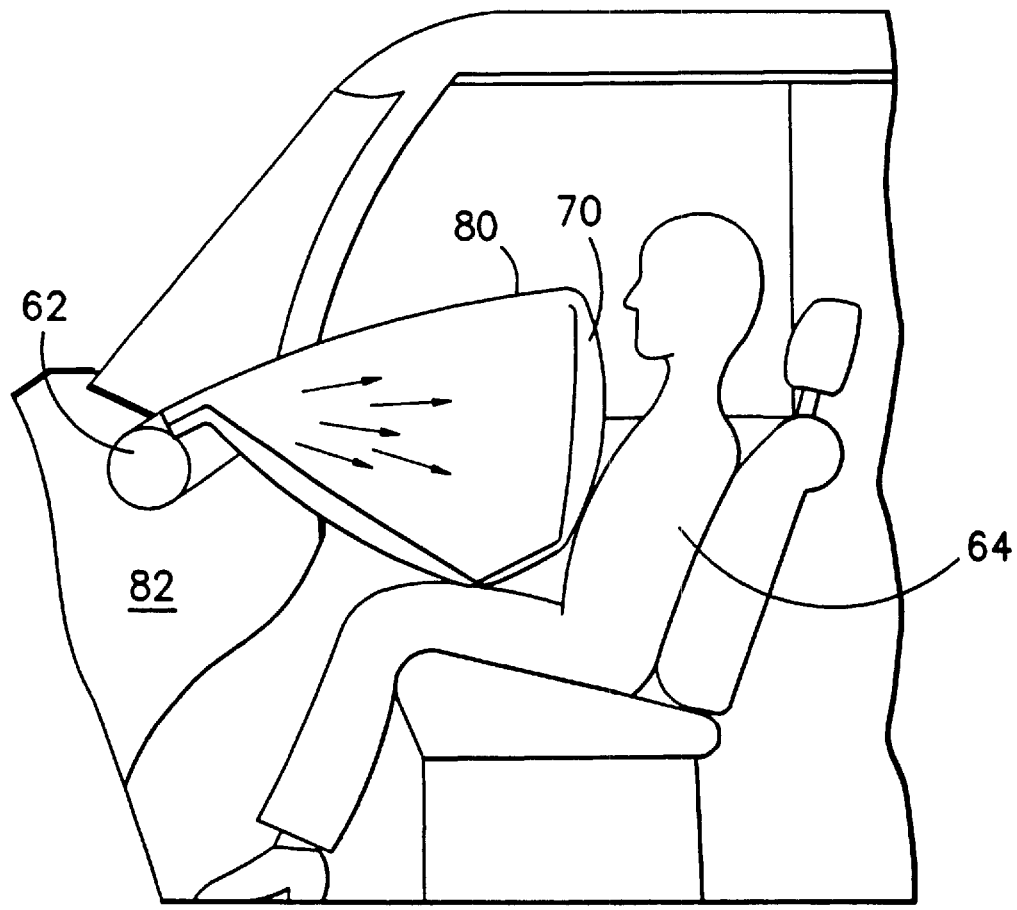
FIG. -11-

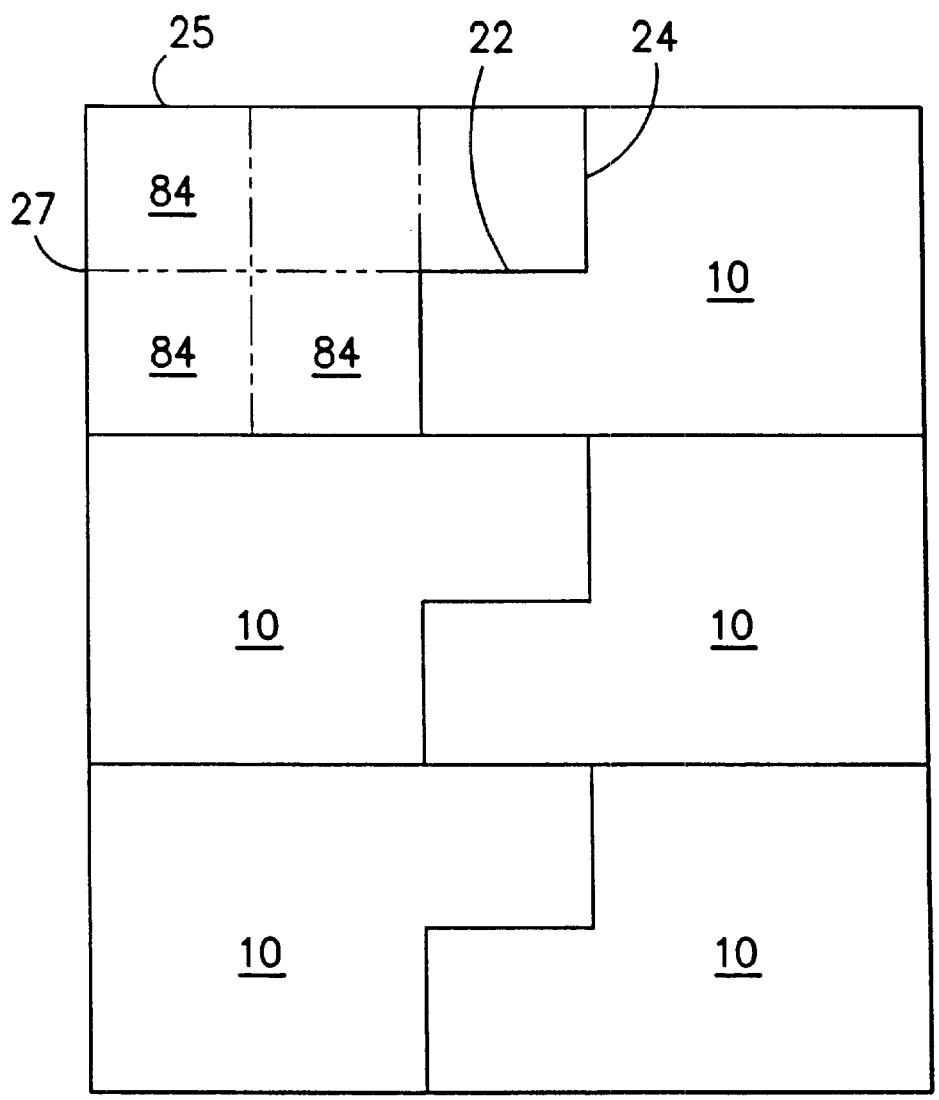
FIG. -12-

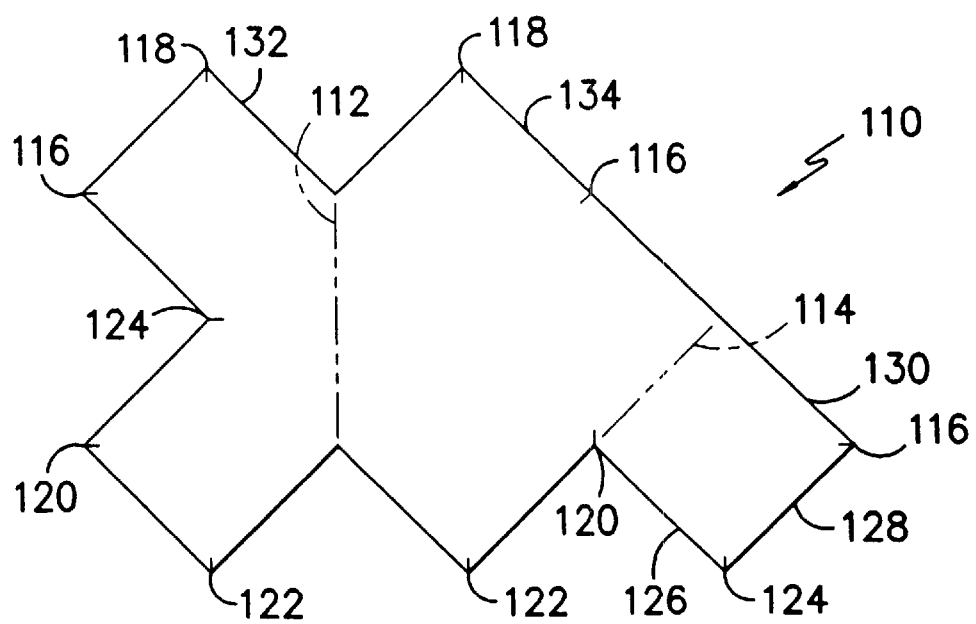
FIG. -13-
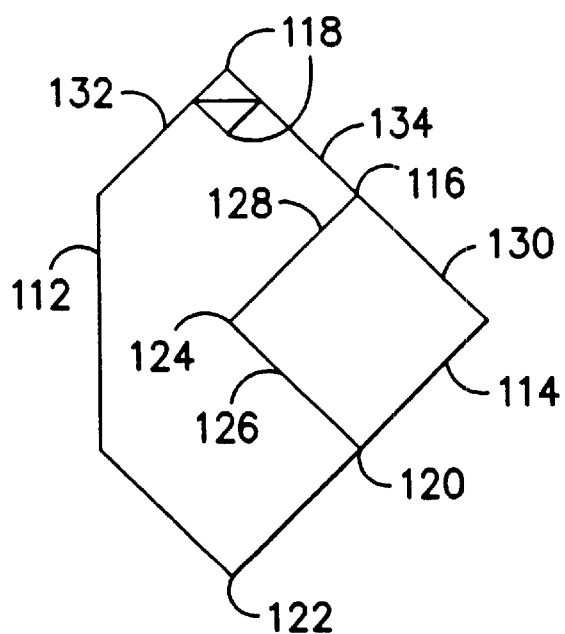
FIG. -13A-

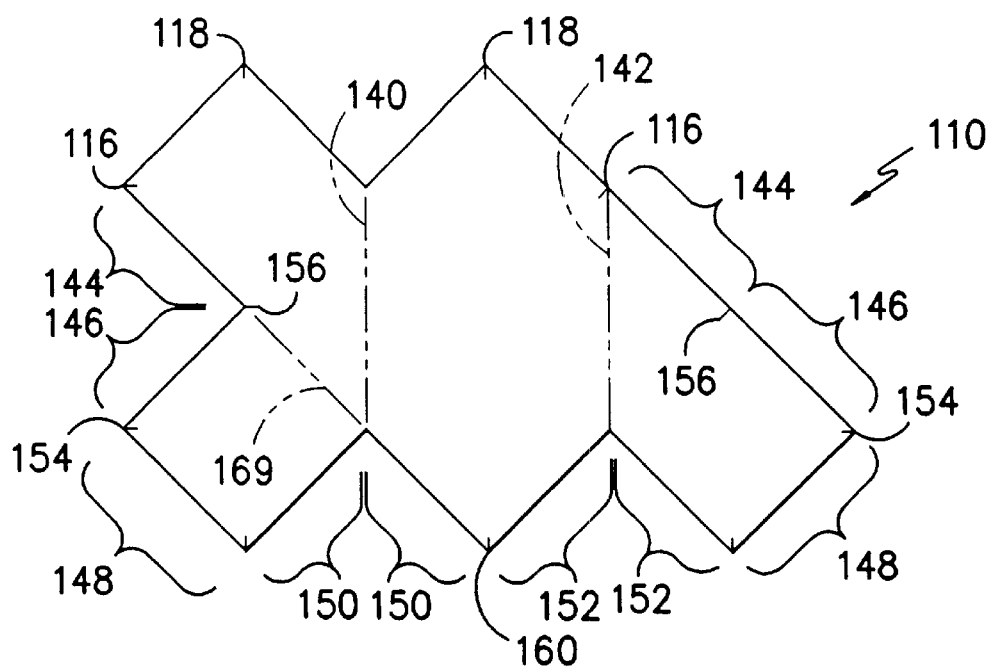
FIG. -14-
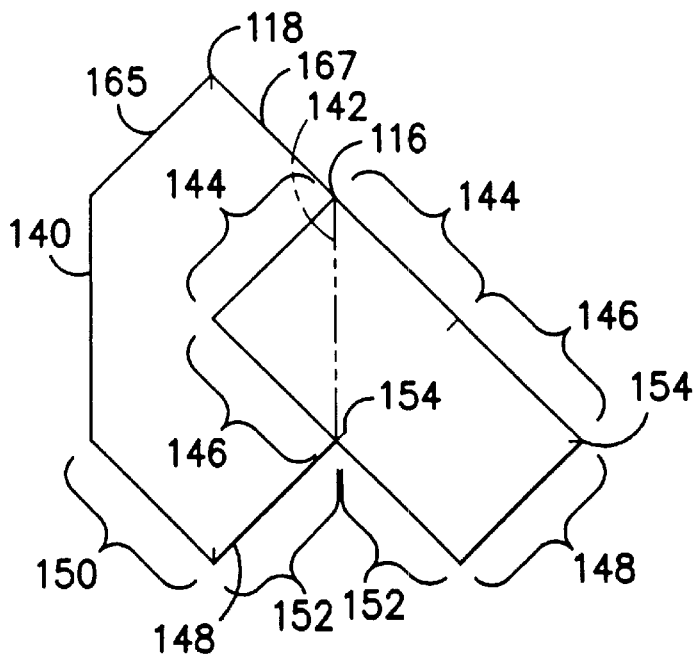
FIG. -14A-

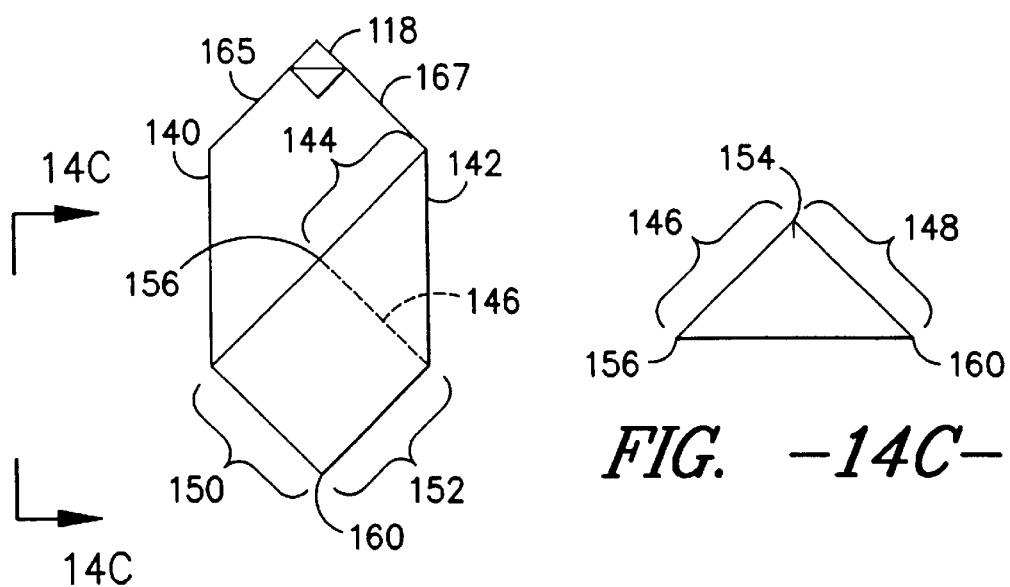
FIG. —14B—
FIG. —14C—
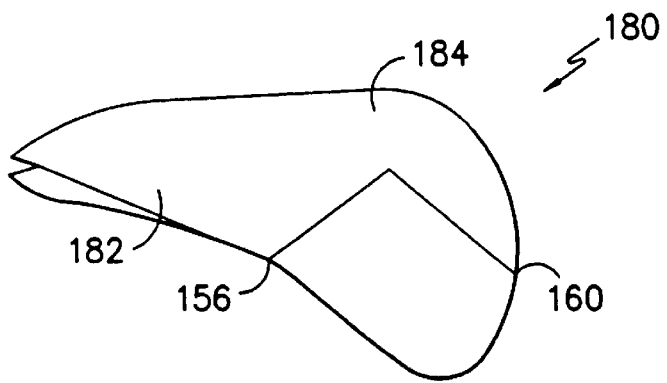
FIG. —14D—

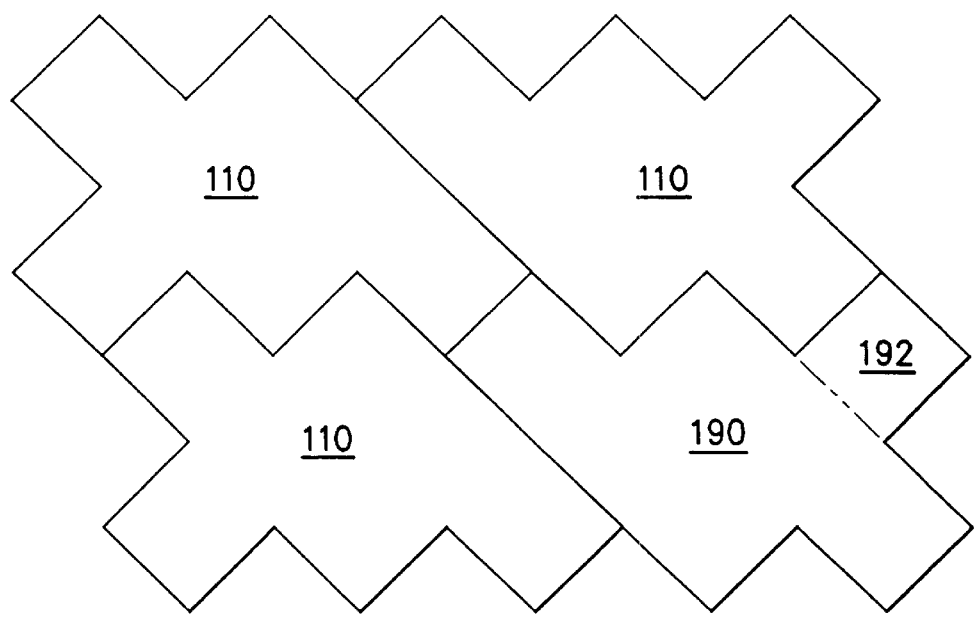
FIG. -14E-
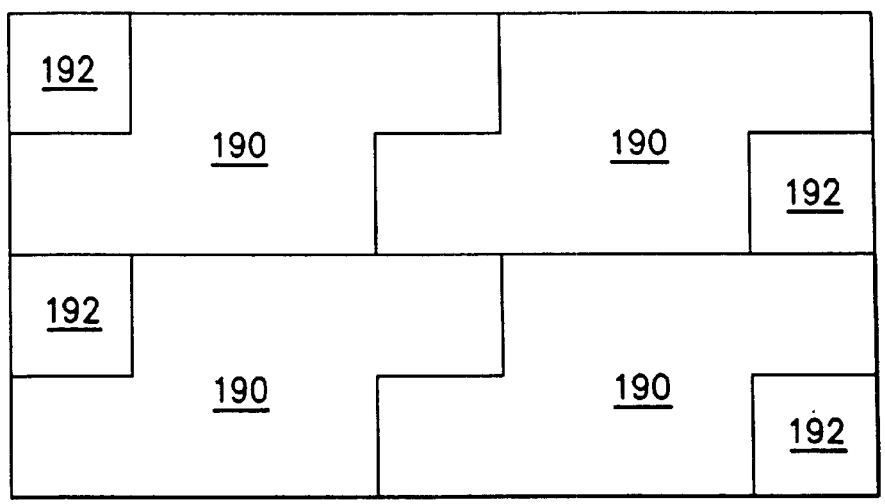
FIG. -14F-

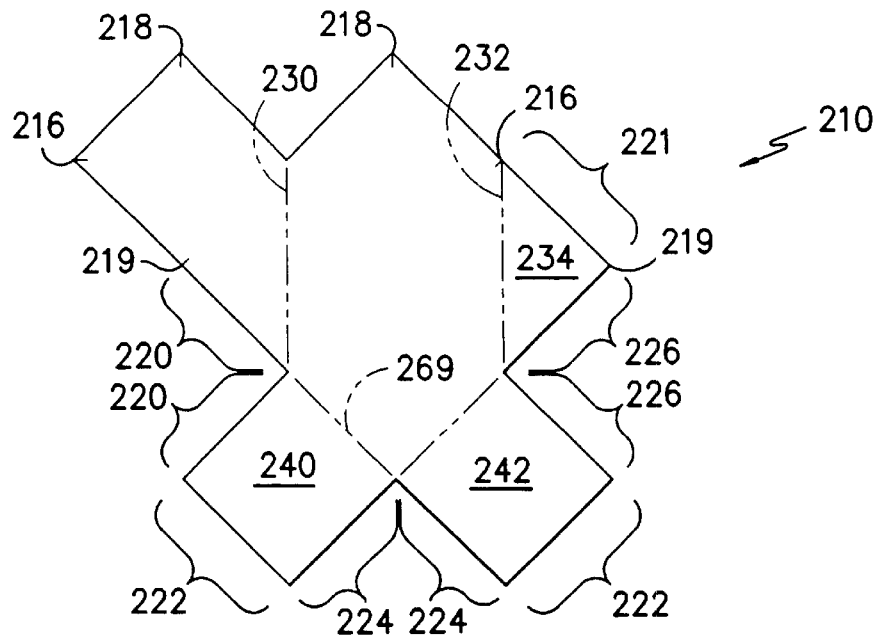
FIG. -15-
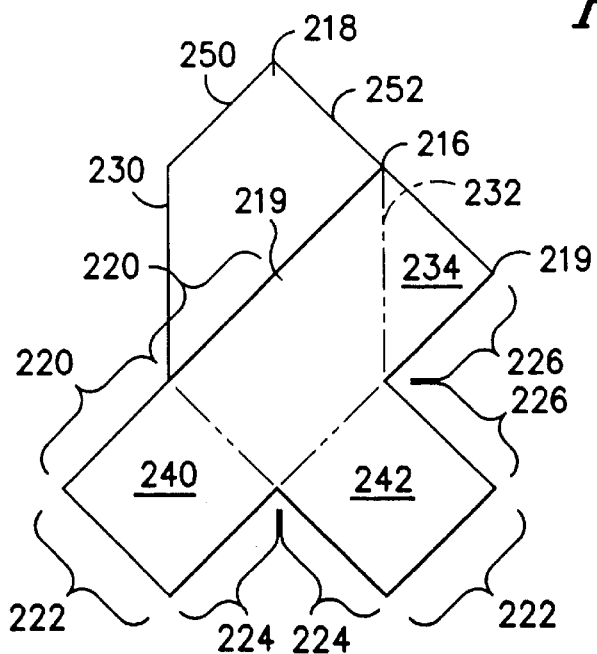
FIG. -15A-

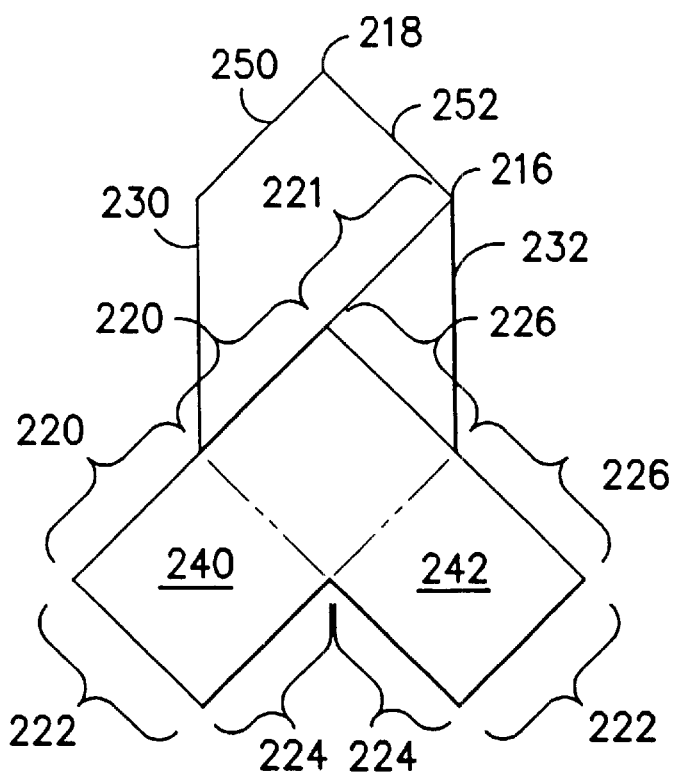
FIG. -15B-
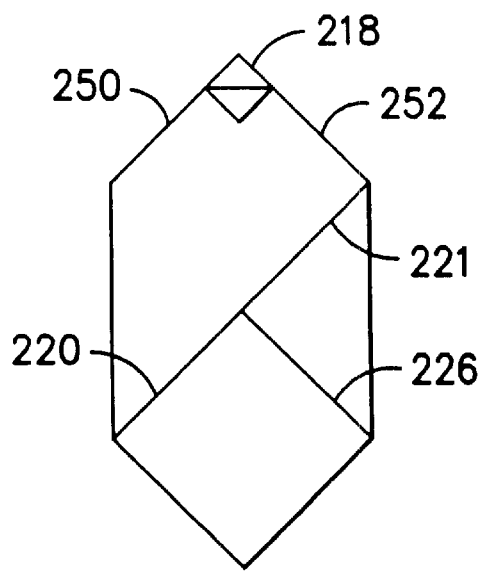
FIG. -15C-

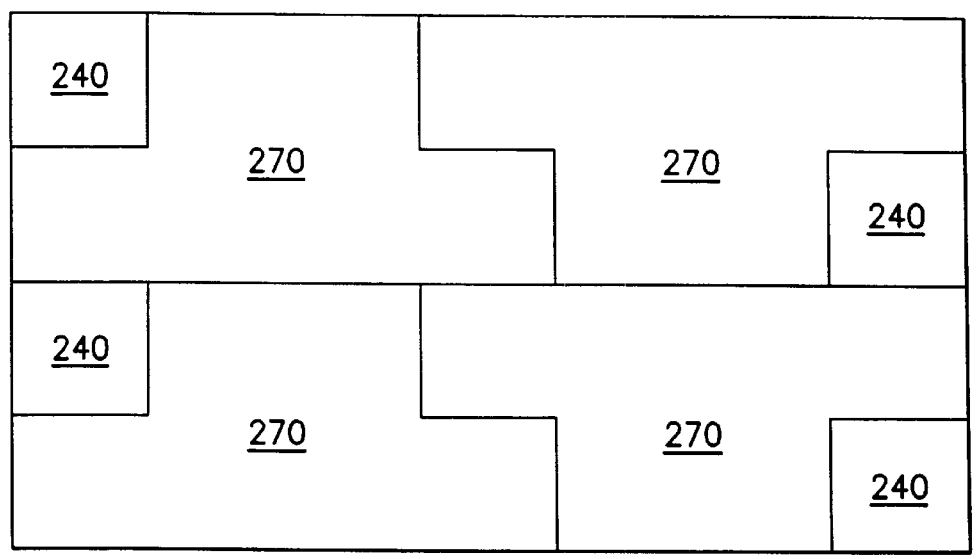
FIG. —15D—

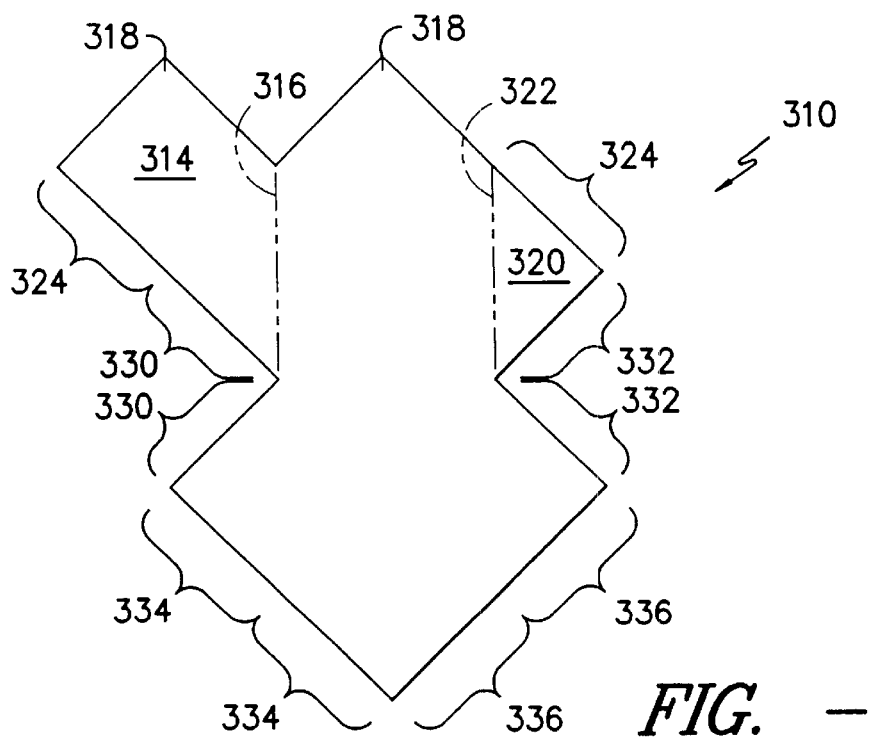
FIG. -16-
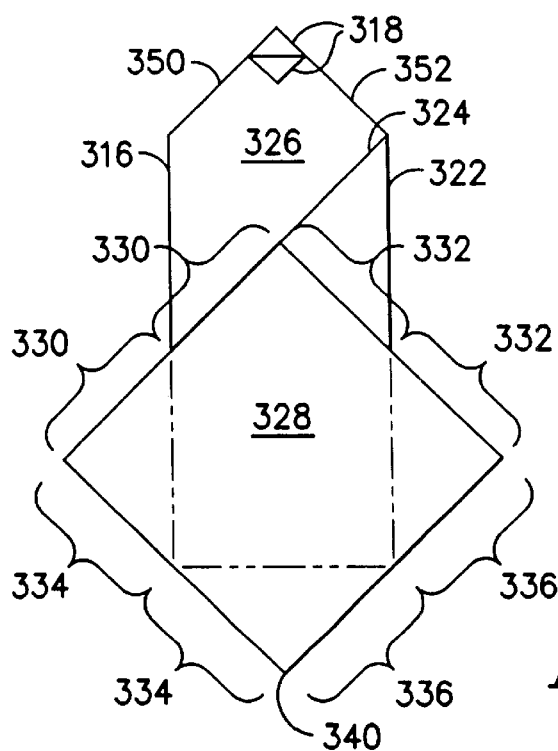
FIG. -16A-

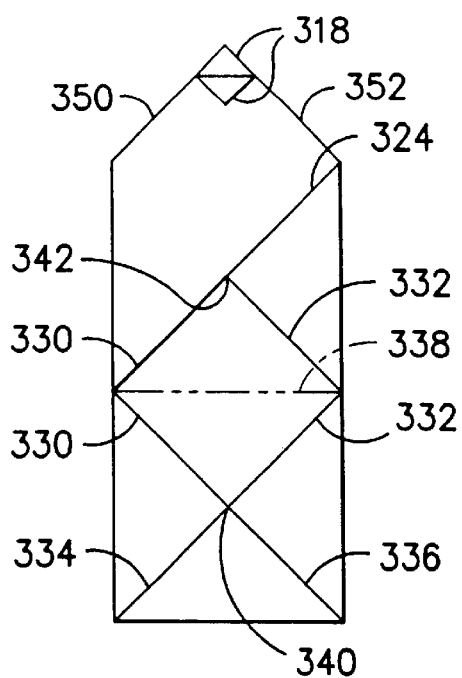
FIG. -16B-
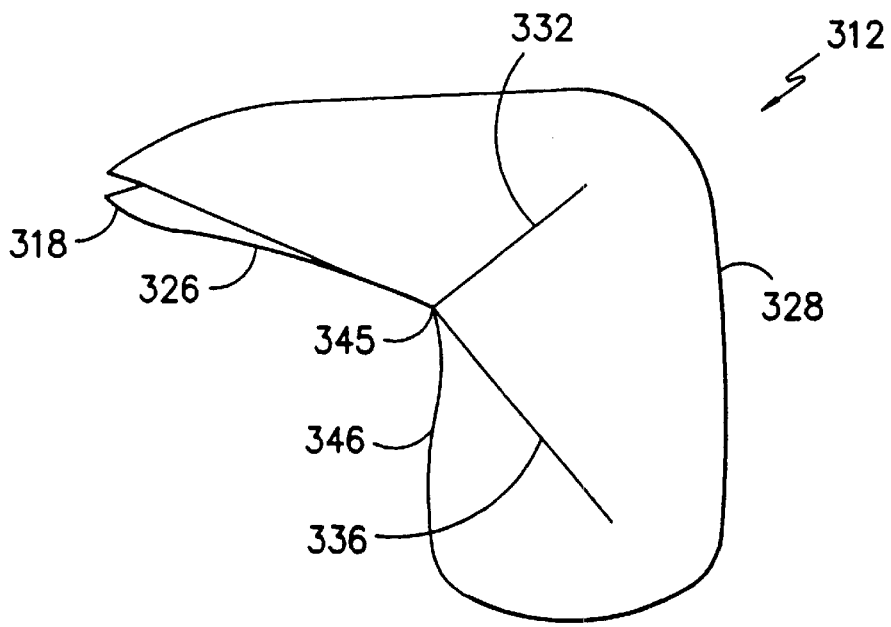
FIG. -16C-

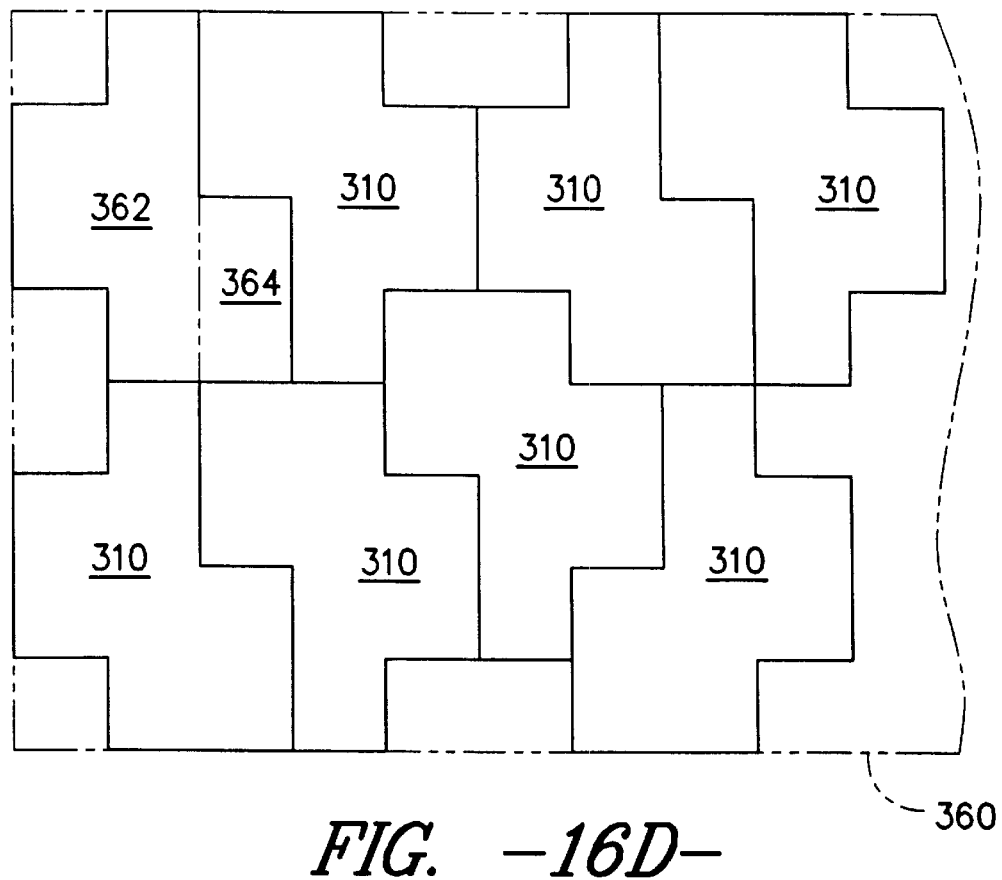
FIG. -16D-
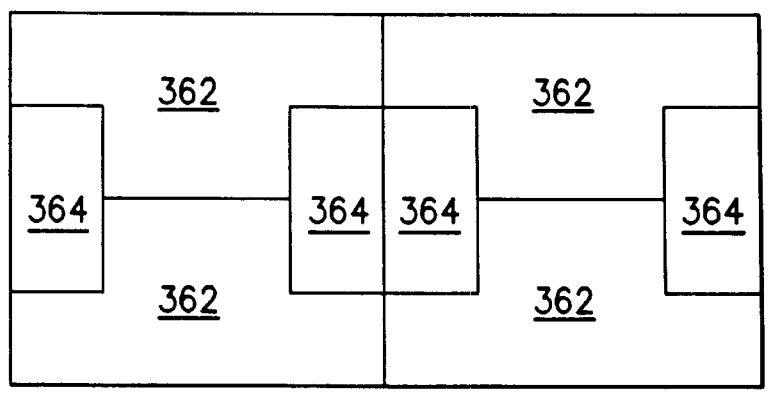
FIG. -16E-

INFLATABLE RESTRAINT SYSTEM AND METHOD

CROSS REFERENCE TO RELATED APPLICATIONS

This application is a continuation of U.S. patent application Ser. No. 60/150,726, filed Aug. 25, 1999, hereby incorporated by reference.

FIELD OF THE INVENTION

This invention relates generally to an inflation based safety system for use in a transportation vehicle and more particularly to an inflatable safety restraint system for use in a motor vehicle such as a motor car for use in conveying an operator and at least one passenger.

BACKGROUND OF THE INVENTION

Inflatable protective cushions used in passenger vehicles are a component of a relatively complex protection system. Such systems typically include an impact sensing device in communication with a gas generator which releases an inflating medium to fill the cushion during an impact event. The inflated cushion is deployed from a compact storage area which is typically located in the dash panel in the case of frontal impact cushions or in the door frame, along the roof line or under the seat in the case of side impact cushions. In both frontal and side impact configurations, the cushion is required to provide adequate dimensional coverage between the occupant to be protected and the interior portions of the vehicle against which the occupant will otherwise be thrown.

In the case of a standard motor car, the vehicle operator is relatively easily protected from injury arising from frontal impact by disposition of a cushion within the steering column. Such driver's side cushions tend to be of a relatively simple construction formed from two circular pieces of fabric sewn along their perimeters. Such a simple configuration proves to be adequate due to the fact that the steering column serves to extend the zone of impact towards the operator with the result that the cushion is not generally required to incorporate any extensions to travel from the storage area to the occupant. Deployment from the steering column also tends to reduce the effective area over which the cushion must be effective since the vehicle operator typically will be seated in relatively close opposing relation to the steering column during any collision event.

Inflatable cushions for use in the protection of drivers against side impacts or passengers against side or frontal impacts must generally have a much more complex configuration since the surfaces to be covered by the cushion are much broader and substantially more distance may exist between the zone of impact by the occupant to be protected and the practical storage location for the cushion within the vehicle structure. Some of the cushions which have been proposed for use in passenger and side applications include those disclosed in U.S. Pat. No. 5,931,498 to Keshavaraj; U.S. Pat. No. 5,855,393 to Keshavaraj; U.S. Pat. No 5,788,270 to Haland et al.; U.S. Pat. No. 5,520,414 to Bishop; U.S. Pat. No. 5,454,594 to Krickl; U.S. Pat. No. 5,423,273 to Hawthorn et al.; U.S. Pat. No. 5,316,337 to Yamaji; U.S. Pat. No. 5,310,216 to Wehner et al.; U.S. Pat. No. 5,090,729 to Watanabe; U.S. Pat. No. 5,087,071 to Wallner et al.; U. S. Pat. No. 4,988,118 to Good et al.; U.S. Pat. No. 4,944,529 to Backhaus; and U.S. Pat. No. 3,792,873 to Buchner et al. (all incorporated herein by reference).

As will be appreciated, many of the previous configurations have required either complex curved seaming operations and/or have utilized geometries which cannot be cut from a roll of fabric or other base material without substantial waste. That is, the pattern for the individual panels forming the cushion cannot be laid out in a close-packed arrangement such that common cut lines are used and fabric between the panels is not wasted. These deficiencies have lead to relatively long assembly times as well as to poor fabric utilization, thereby increasing the overall cost of manufacturing passenger and extended side passenger cushions.

SUMMARY OF THE INVENTION

The general object of the present invention is to provide highly efficient inflatable restraint cushions for use in passenger and side impact situations which cushions are capable of being formed with a very low level of wasted fabric or other base material.

It is a further object of the present invention to provide highly efficient inflatable restraint cushions for use in passenger and side impact applications which may be formed using substantially all straight seams.

It is yet a further object of the present invention to provide a frontal impact inflatable restraint cushion for use on the passenger side of a motor vehicle which may be seamed in not more than 95 seconds.

It is yet a further object of the present invention to provide a common fabric panel configuration which is useable in a highly efficient manner for both frontal and side impact applications.

Still a further object of the present invention is to provide an inflatable restraint cushion for use on the passenger side of a motor vehicle formed by folding and seaming a material blank of textile fabric such that the seams enclosing the impact portion of the cushion are disposed substantially along the bias of the base fabric forming the cushion.

Another object of the present invention is to provide a highly efficient frontal impact inflatable restraint cushion for use on the passenger's side of a motor vehicle having an absence of seams in the region of impact by the vehicle occupant during a collision event.

Yet a further object of the present invention is to provide a method for forming a highly efficient substantially flat curtain cushion for use in protecting a vehicle occupant during an extended roll over event which cushion retains at least about 90 percent of its deployment pressure for 60 seconds following deployment.

In accordance with one aspect of the present invention, an inflatable restraint system for use in a transportation vehicle having a dash panel and space for an operator and a passenger is provided. The restraint system includes at least one gas generator housed within the dash panel and an inflatable cushion in fluid communication with the gas generator. The inflatable cushion which may be formed from a single blank of material includes an impact portion for contact with the passenger during a frontal collision and a neck portion which extends away from the impact portion towards the gas generator. The impact portion of the inflatable cushion has a seam free contact surface for contact with the passenger during a collision event and a rear surface which opposes the dash panel upon inflation. The impact portion and the neck portion are adjoined and enclosed by a plurality of substantially straight seams. The inflatable protective cushion is characterized by a substantially arcuate inflated profile such that the impact portion of the cushion extends in curved relation at least partially around the dash panel during a collision event. The inflatable protective cushion is formed from one or more precut panels of fabric or other base material which panels have geometric configurations such that the precut panels may be cut according to a repeating pattern from a roll of fabric or other base material in a close packed orientation substantially with minimal waste across the interior of such roll of fabric. The inflatable protective cushion being further characterized by a low structural seam assembly time.

Additional objects and advantages of the invention will be set forth in part in the description which follows, and in part will be obvious from the description, or may be learned by practice of the invention.

While the invention is illustrated and will be described in connection with several potentially preferred embodiments, it is to be understood that both the foregoing general description and the following detailed description are exemplary and explanatory only and are in no way to be construed as restrictive of the invention. On the contrary, it is the intent of the applicants to cover all alternatives, modifications, and equivalents as may be included within the true spirit and scope of the invention as limited only by the allowed claims as appended hereto.

BRIEF DESCRIPTION OF THE DRAWINGS

The accompanying drawings, which are incorporated in and constitute a part of this specification, illustrate several embodiments of the invention and together with the description serve to explain the principles of the invention wherein:

FIG. 1 is a plan view of a precut material blank for folding and seaming to form an inflatable cushion.

FIG. 2 is a plan view similar to FIG. 1 illustrating a first fold in an inflatable protection cushion.

FIG. 3 is a plan view similar to FIG. 2 illustrating a second fold in an inflatable protection cushion.

FIG. 4 is a plan view similar to FIG. 3 illustrating an enclosing fold and straight seam lines for an inflatable protection cushion.

FIG. 5 is a plan view of a precut material blank substantially identical to FIG. 1 illustrating fold lines for application in formation of a substantially flat inflatable curtain cushion for disposition between an occupant and the vehicle window and door during a side collision or roll over event.

FIG. 6 is a plan view similar to FIG. 5 illustrating a first fold in formation of a substantially flat inflatable curtain cushion.

FIG. 7 is a plan view similar to FIG. 6 illustrating a second enclosing fold and seam lines defining a substantially flat inflatable curtain cushion.

FIG. 8 is a side view of the substantially flat inflatable curtain cushion of FIG. 7 further including the use of expansion limiting gas channeling means.

FIG. 9 is a side view of the interior of a motor vehicle illustrating the substantially flat inflatable curtain cushion of FIG. 7 in the operative state.

FIGS. 10A–C illustrate various potential panel geometries for placement along line 10—10 of FIG. 8 to produce a frontal impact passenger cushion.

FIG. 11 illustrates an inflatable frontal impact passenger cushion according to FIGS. 8 and 10 in the operative state.

FIG. 12 illustrates a potential pattern layout for cutting the material blanks of FIGS. 1 and 5 showing base material utilization.

FIG. 13 illustrates a precut material blank for use in forming either a substantially flat inflatable side curtain cushion or a passenger's side frontal impact cushion including fold lines for formation of an inflatable side curtain cushion.

FIG. 13A illustrates a folded inflatable side curtain formed using the fabric blank and fold lines illustrated in FIG. 13.

FIG. 14 illustrates a plan view substantially identical to FIG. 13 but showing the fold lines useful in forming a passenger frontal impact cushion.

FIG. 14A is a partial assembly view of a passenger frontal impact cushion formed from the precut material blank illustrated in FIGS. 13 and 14.

FIG. 14B is a plan assembly view of a passenger frontal impact cushion formed from the precut material blank illustrated in FIGS. 13 and 14.

FIG. 14C is a view taken along line 14C—14C in FIG. 14B illustrating the impact portion of the passenger frontal impact cushion formed from the precut material blank illustrated in FIGS. 13 and 14.

FIG. 14D is a profile view of the passenger side frontal impact cushion according to the present invention formed from the precut material blank illustrated in FIGS. 13 and 14.

FIG. 14E illustrates a possible pattern layout for the precut material blank illustrated in FIGS. 13 and 14 incorporating a one piece construction.

FIG. 14F illustrates a possible pattern layout for the material blank illustrated in FIGS. 13 and 14 incorporating a two piece construction.

FIG. 15 illustrates a plan view of a precut material blank geometry illustrating fold lines to form a passenger frontal impact cushion.

FIG. 15A illustrates a partial assembly view of a passenger frontal impact cushion formed from the precut material blank illustrated in FIG. 15.

FIG. 15B illustrates a partial assembly view of a passenger frontal impact cushion formed from the precut material blank illustrated in FIG. 15.

FIG. 15C is a plan assembly view of a passenger side frontal impact cushion formed from the precut material blank illustrated in FIG. 15.

FIG. 15D illustrates a possible pattern layout for the precut material blank illustrated in FIG. 15.

FIG. 16 illustrates a plan view of a material pattern for use in forming a passenger's frontal impact cushion.

FIG. 16A illustrates a partial assembly view of a frontal impact cushion formed from the material pattern illustrated in FIG. 16.

FIG. 16B illustrates a profile view of a frontal impact passenger's bag formed from the material pattern illustrated in FIG. 16 in the operative state.

FIG. 16C is a rear view of the frontal impact passenger's bag illustrated in FIG. 16B.

FIG. 16D illustrates one possible pattern layout for a one piece material pattern in accordance with FIG. 16

FIG. 16E illustrates a possible segmentation pattern for a two piece material section of geometry as illustrated in FIG. 16 which maximizes fabric utilization.

DESCRIPTION OF PREFERRED EMBODIMENTS

Turning now to the accompanying drawings, reference will be made in detail to the present preferred embodiments, examples of which are illustrated herein. Wherever possible, the same reference numerals will be used throughout the various views to refer to the same or like components.

Referring now to FIG. 1, in accordance with one potentially preferred embodiment, of the present invention, a precut blank 10 of material such as a woven, nonwoven or knitted textile fabric either with or without a permeability blocking coating is folded and seamed to form an enclosed structure suitable for accepting and at least temporarily containing a gaseous inflation medium. The material forming the precut blank 10 as well as other later described structural components is preferably a woven textile formed by means of water or air jet weaving of polyester or polyamide yarns such as nylon 6, or nylon 6.6 having a linear density of about 30 to about 630 denier, more preferably having a linear density of about 105 to about 525 denier and most preferably having a linear density of about 210 to about 420 denier.

In the event that uncoated fabric is utilized, such fabric will preferably be characterized by an air permeability of not greater than about 2.5 cfm of air per square foot of fabric at a pressure differential of 0.5 inches of water when measured in accordance with Federal Test Method Standard No. 5450. More preferably, the air permeability is not greater than 1.5 cfm and most preferably the air permeability is about 1 cfm or less. Such fabric will also preferably have undergone a sanforizing treatment for enhancement of permeability characteristics.

In the event that a coated fabric is utilized, such coating will preferably be applied at a very light level of not greater than about one ounce per square yard and more preferably at a level of not greater than about 0.7 ounces per square yard and most preferably at a level of about 0.3 ounces per square yard or less. Potentially preferred coating materials include neoprene rubber, silicone, urethanes and polyamide dispersions. It is also to be understood and appreciated that portions of the material forming the cushion may be coated while others are left uncoated.

In the embodiment of the invention illustrated in FIGS. 1–4, the blank of material 10 includes a main body portion 12, a substantially trapezoidal extension 14 and two triangular extensions 16, 18. As illustrated in FIG. 2, assembly of the cushion involves folding the substantially trapezoidal extension 14 into the main body portion 12 along a fold line 20. In the illustrated and the potentially preferred practice, the adjacent legs 22, 24 of the substantially trapezoidal extension 14 mate precisely with the adjacent upper boundary edges 22a, 24a of the main body portion 12. As illustrated in FIGS. 3 and 4, the triangular extensions are folded inwardly along fold lines 26, 28 to form a structure which may be fully enclosed by the introduction of substantially straight seams along seam lines 30, 32 as shown. Seams are also preferably introduced partially along outboard perimeter edges 22, 24 so as to form a mouth opening 34 adaptable for attachment to a gas generator (not shown).

The resulting configuration as illustrated in FIG. 4 is believed to be particularly useful in the protection of an occupant during a side impact event. Moreover, due to the fact that the resulting configuration is extremely flat, the cushion may be packed in a very small space within the seating frame or door frame of the vehicle. Furthermore, the use of the substantially straight, relatively short seam lines permits the introduction of seams within a very short period allowing basic bag structural seam assembly to be substantially completed within about 45 seconds or less with virtually no waste of material since the starting geometry may be repeated across a roll of base fabric with no voids between the cut parts (FIG. 12).

In accordance with an aspect of the present invention, blanks of material may be standardized and used for multiple applications depending upon the folding and seaming procedures which are utilized. By way of example only and not limitation, the precut blank of material 10 may be used to form a substantially flat inflatable curtain cushion when folded and seamed according to the procedures illustrated in FIGS. 5–7.

In FIG. 5, the blank of material 10 is divided into a substantially trapezoidal extension 14, a profile defining interior section 38 and an elongate rectangular flap 40. As shown in FIG. 6, the substantially trapezoidal extension 14 is folded into the profile defining interior section 38 such that the adjacent legs 22, 24 of the trapezoidal extension 14 are mated to the adjacent upper boundary edges 22a, 24a of the of the interior section 38. In the illustrated and potentially preferred practice, the base leg 42 of the trapezoidal extension is disposed across the interior section in substantially parallel relationship to the outer edge 44 of the elongate rectangular flap 40. The elongate rectangular flap 40 is then folded inwardly along a fold line 46 thereby mating the outer edge 44 to the base leg 42 of the trapezoidal extension to define a seam line 48 (FIG. 7).

In a potentially preferred practice, enclosing seams are introduced along the open perimeter segments 22, 24, 50 formed by the above described folding operation. A connective seam is preferably applied along seam line 48 which joins the outer edge 44 of the elongate rectangular flap 40 to the base leg 42 of the trapezoidal extension. If desired, this connective seam may, at least along a portion of its length, pass through to the underlying profile defining interior section 38 so as to further limit the inflated depth of the resulting cushion (i.e. to maintain a flat profile) as well as to channel the gaseous inflation medium. As illustrated, in a preferred practice a mouth opening 52 is left unseamed to permit introduction of an inflation medium during operation.

As will be appreciated, the cushion 54 illustrated in FIG. 7 will expand in a relatively flat orientation so as to be highly suitable for disposition between an occupant and the space between the vehicle frame pillars (i.e. the space occupied by the windows). In FIGS. 8 and 9 there is illustrated one potentially preferred orientation of the cushion 54 to be housed in the roof line of a vehicle 60 for operative deployment downward during a collision event. In such a configuration both the cushion 54 and at least one gas generator 62 along with any tethers 64 are housed in the roof line such that upon expansion the cushion tends to roll down into the deployed state illustrated in FIG. 9 so as to provide protection to the head and upper body of an occupant 65 seated in either a driver or passenger seat during a side impact or extended roll over event.

In the event that the cushion 54 is to be used to protect the occupant during an extended roll over event, it is necessary that the operative inflated state be maintained for an extended period. To achieve this objective, it is believed that the cushion 54 should be characterized by an extremely low permeability whereby air leakage through the fabric and seams is extremely low at operating pressures up to about 4.5 psig such that a cushion filled to this level will not experience a pressure reduction of more than about 20 percent and preferably not more than 10 percent upon deployment for 60 seconds.

Such permeability characteristics are believed to be achievable through selection of a low permeability base material such as a silicone or polyamide coated textile fabric in combination with stitchless seaming practices such as adhesive bonding or the like which do not involve forming holes in the base material. It is also believed that multiple or multistage inflators with feedback control tied to the inflation pressure of the cushion such that the pressure is periodically revived during an extended crash event may also aid in maintaining inflation pressure.

It is also believed that in the event that sewn seams are to be utilized, gas retention may be substantially improved by combining such sewn seams with internally disposed adhesives which are disposed across the fabric blank in the regions where seaming is to take place before the seams are introduced and which are activated by heat or other means to fill the seam voids after sewing takes place.

While the cushion 54 has been illustrated as being deployable from a roof mounted position, it is likewise to be appreciated and understood that it may also be deployable from a location 66 near the intersection between the dash panel and the door frame (i.e. near the lower corner of the window) or from a corresponding position at the rear of the vehicle if a rear seated passenger is to be protected. In the event that such deployment is to be utilized, the cushion will preferably be oriented such that the fold line 46 will extend along the base of the window and fold line 20 will extend along the "A" pillar 68 (or "C" pillar in the case of a rear seated passenger) of the vehicle frame.

Although the resulting cushion 54 is characterized by a naturally flat expanded profile, the expanded profile may be further controlled by the introduction of one or more seams or other linear or point shaped links 69 (FIG. 8) between the fabric layers extending across the interior of the cushion thereby connecting the surfaces and further permitting the inflation medium to be channeled to desired locations.

In accordance with an aspect of the present invention, the precut blank of material 10 as illustrated in FIGS. 1 and 5 and folded in accordance with FIGS. 6 and 7 may also be used as the body portion of a passenger's side frontal impact cushion by the addition of impact panels of extremely simple geometric configurations which preferably are characterized by substantially straight line configurations. Accordingly, if a vehicle is to utilize any combination of a frontal impact cushion, a side curtain cushion or a hip and torso protection cushion, a common precut blank of material 10 may be utilized in the manufacturing process thereby providing an opportunity to reduce complexity and overall cost of the total safety system.

By way of example only and not limitation, several potentially preferred geometric configurations for impact panels 70 to be disposed along line 10—10 (FIG. 8) are illustrated in FIGS. 10A, 10B, and 10C. As shown, each of the illustrated embodiments are characterized by substantially straight line configurations so as to promote fabric utilization and seaming efficiency.

Referring now to FIGS. 8 and 10A–C, according to one potentially preferred practice, line segments 22, 24, and 50 are left unseamed and line segments 72 and 22 are seamed to one another such that points 74 and 76 meet. The remaining edges of the impact panels are then seamed along line segments 24, 50 ultimately meeting at the upper limit of the body opening 78. Unlike the curtain cushion 54 which is substantially flat in its operative expanded profile, the passenger's side frontal impact cushion 80 (FIG. 11) which is typically to be housed in the dash panel 82 and operatively connected to a front mounted inflator 62, is characterized by a relatively deep profile. As will be appreciated, the depth and breadth of such a cushion is largely a function of the geometry of the impact panel 70 which is utilized. Thus, if an impact panel of a configuration as illustrated in FIG. 10A is to be utilized, a deep profile will be obtained, while an impact panel of a configuration as shown in FIG. 10B will yield a flatter broader profile and an impact panel as shown in FIG. 10C will tend to yield a rounded profile.

As illustrated in FIG. 12, the precut blank of material 10 is preferably of a substantially straight line geometry wherein the length of each perimeter line segment is an integer multiple of the shortest perimeter line segment. That is, the short line segments 22, 24 are of a first unit length, while line segment 27 is 2 times that length and line segment 25 is 3 times that length. This is illustrated by the fact that the precut blank is divisible into a series of squares 84 the sides of which each have a length equal to the length of the shortest perimeter line segment in the precut blank 10. The use of such straight line configurations is believed to aid in the ability to arrange multiple cut pieces across a sheet taken from a roll of fabric in a substantially close packed, keyed together relationship such that cutting is performed along multiple common lines and little if any fabric is wasted within the interior of the roll. Through use of such a close packed relationship, it is believed that the level of wasted unused fabric within a roll between the cut pieces but excluding boundary edges may be held to a level of not greater than about 10 percent, more preferably not greater than about 5 percent and most preferably about zero to 5 percent.

In FIG. 13 there is illustrated a precut fabric blank 10 for use in formation of either a substantially flat side curtain cushion useful in a manner such as described in relation to FIG. 9 or useful in the production of a passenger's side frontal impact cushion. In the event that a side curtain is to be formed, folds are introduced along fold lines 112, 114 thereby bringing together points 116, 118, 120, 122, and 124. The cushion is thereafter enclosed by introduction of seams along substantially straight seam lines 126, 128, 130 and partially along lines 132 and 134 as shown, thereby leaving an opening 118 for introduction of a gaseous inflation medium from an inflator.

In FIG. 14 there is illustrated a precut material blank 110 of a geometry exactly as illustrated in FIG. 13 but showing fold lines 140, 142 for use in production of a passenger's side frontal impact cushion which will conform substantially to the curve of a dash panel in the operative state. In the illustrated and potentially preferred practice, the material blank is folded along line 140 so as to bring together corresponding points 116, 118 and line segments 150 in the manner shown in FIG. 14A such that line segment 148 overlies line segment 152. Thereafter, a fold may be introduced along fold line 142 bringing together line segments 144, 146, 148, and 152 along which straight seams are introduced. A straight seam is also introduced along line segment 150. The resulting structure as illustrated in FIGS. 14B and 14C is a cushion wherein at one end there is a diamond shaped base rising to a deep pyramidal cross section.

In the operational inflated mode illustrated in FIG. 14D the cushion 180 takes on a natural arcuate profile which is believed to be useful in deployment from a dash panel. Moreover, the cushion includes an integral neck portion 182 suitable for fluid communication with a gas generator. The neck portion also serves to extend the impact portion 184 of the cushion towards the occupant such that the impact portion tends to curve around a typical dash panel.

One possible layout for the precut material blank 110 is illustrated in FIG. 14E showing the utilization of base material when a single piece fabric blank is utilized. In a potentially preferred arrangement, fabric utilization efficiencies may be raised to nearly 100 percent if the operator is willing to utilize a two piece fabric blank incorporating separately cut segments 190, 192 as shown in FIG. 14F.

The identical cushion configuration obtained from the material blank 110 illustrated in FIG. 14 may be obtained from the starting material blank 210 illustrated in FIG. 15. In carrying out such formation, a fold is introduced along fold line 230 so as to mate the corresponding points 216, 218 as shown in FIG. 15A. Thereafter, triangular segment 234 is folded inwardly so as to mate the corresponding points 219 in the manner shown in FIG. 15B. Outboard panels 240, 242 are folded inwardly towards one another and seams are introduced along line segments 221, 220, 222, 224, 226 yielding the final plan view configuration illustrated in FIG. 15C. The resulting cushion is believed to be identical to that illustrated in FIG. 14D. One potentially preferred pattern layout for the components 240, 270 forming the material blank illustrated in FIG. 15 is shown in FIG. 15D demonstrating the ability to achieve nearly 100 percent fabric utilization.

In accordance with the above description relating to FIGS. 14 and 15 it will be appreciated that in the event that a single piece precut material blank 110, 210 is utilized, the cushion may be formed from 5 straight body seams of substantially equal length and two straight neck seams running partially along line segments 165, 167 (FIG. 14B) and 250, 252 (FIG. 15C) towards the mouth opening, 118, 218. In the event that the operator is willing to utilize a two piece material blank in which a single straight seam is introduced along line 169 (FIG. 14) or 269 (FIG. 15) one additional seam of the same length as each of the others is required although fabric utilization is raised to nearly 100 percent. Thus, formation of a frontal impact passenger side cushion 180 as illustrated in FIG. 14D requires either 7 or 8 straight seams. It is estimated that final total structural seam length for a passenger frontal impact cushion will be in the range of about 55 to about 140 linear inches depending upon the size of the cushion required. The seaming time required to apply such seams will preferably be in the range of about 60 to about 140 seconds and preferably 95 seconds or less.

As will be appreciated by those of skill in the art, the relatively short overall seam length as well as the substantially straight nature of the seams themselves used in the preferred designs permits such efficiencies to be utilized. In the potentially preferred practice, not less than about 85 percent of the total structural seam length (i.e. excluding seams for reinforcements, tethers and the like) will be comprised of straight seams, more preferably not less than about 95 percent of the total structural seam length will be comprised of straight seams. Most preferably, substantially 100 percent of the total structural seam length will be comprised of straight seams meaning that the line segments forming such seams are not curved. In addition, the percentage of unused base material disposed between the individual cut panels across the interior of a roll of the base material will preferably be not greater than about 10 percent, more preferably not greater than about 5 percent and most preferably about zero to 5 percent.

Turning now to FIG. 16, there is illustrated a material blank 310 for use in formation of a deep curved passenger frontal impact cushion 320 as shown in FIG. 16C. The material blank 310 includes a substantially trapezoidal extension 314 which is folded inwardly along fold line 316 such that corner locations 318 are in overlying relation to one another. Outboard triangle portion 320 is likewise folded inwardly along fold line 322 such that line segments 324 mate and may be seamed together thereby forming an encloseable neck portion 326 (FIG. 16A). An impact portion 328 is formed by seaming together corresponding line segments 330, 332, 334, and 336 such that the cushion takes on a natural fold along line 338 such that points 340, 342 are brought together thereby forming a convergence of seam lines at a location 345 (FIG. 16C) disposed on the rear face 346 of the impact portion 328 which at least partially surrounds the dash panel during deployment. If desired, a reinforcing patch or other additional reinforcement means may be applied at this point. Using such a seam configuration results in no seam extending across the surface to be impacted by the occupant during deployment. Such a design is believed to aid in the prevention of occupant abrasion during deployment and impact.

In the event that the material blank 310 is to be formed from a single piece of material, an arrangement of the cut parts across a roll of base material 360 is illustrated in FIG. 16D. However, as with the previously described geometric arrangements, in the event that the operator is willing to segment the material blank into two portions 362, 364 it becomes possible to arrange the individual portions across the roll substantially without waste of material (FIG. 16E).

As will be appreciated, the impact portion takes on a substantially square configuration thereby providing good overall coverage of the zone in front of the passenger to be protected. Moreover, this arcuate cushion with a broad striking surface is formed using only 5 straight body seams 324, 330, 332, 334, 336 of substantially equal length and two mouth seams extending partially along line segments 350, 352 towards the mouth opening. The total structural seam length is to be in the range of about 55 to about 140 linear inches depending upon the size of the cushion and upon whether a one or two piece material blank is utilized. Total time required to apply the structural seams will preferably be in the range of about 60 to 140 seconds and will preferably be 95 seconds or less. The percentage of the total structural seam length which is straight is preferably about 85% or greater, more preferably about 95% or greater and most preferably about 100%. The amount of fabric which is wasted in cutting of the material blank forming the cushion is preferably not greater than about 10%, more preferably not greater than about 5%, and most preferably about zero to 5%.

As will be noted by the skilled artisan, aside from the benefits of material utilization and seaming efficiency, the above described embodiments have the additional benefit of providing a seaming arrangement which permits the seams enclosing the impact portion of the cushions to be placed substantially along the bias of any base textile fabric which may be used to form the material blank 10, 110, 210, 310 from which the cushion is formed. That is, the material blank may be cut and folded such that the load bearing seams (ex. 220, 221, 226, 324, 330, 332) tend to run along lines approximately at a 45 degree angle to the primary yarn directions. Such an arrangement is believed to increase the strength of the resulting cushion, thereby permitting lower weight fabrics incorporating yarns having relatively low linear densities of about 210 to 315 denier or lower to be utilized with no adverse impact on performance.

In view of the above described nonlimiting exemplary configurations, it may be seen that the present invention provides for cushion configurations which make use of available base material in a highly efficient manner. Moreover, seaming is highly efficient in terms of both total structural seam length (i.e. excluding reinforcements tethers, etc.) as well as seam complexity as measured in terms of the overall percentage of structural seam length which is non-curved. These beneficial features may be quantified in terms of an assembly efficiency factor (AEF) defined as follows:

$$AEF = \text{percent of structural seam length which is straight} \times \text{percent material utilization total seam length in centimeters.}$$

By way of illustration, a cushion having a total structural seam length of 55 inches (139.7 cm) using all straight seams and 100 percent fabric utilization is characterized by an AEF of 71.6; while a cushion having a total structural seam length of 100 inches (254 cm) using all straight seams and 90 percent fabric utilization is characterized by an AEF of 35.4. The frontal impact passenger cushions as disclosed herein are believed to be characterized by assembly efficiency factors in the range of about 21.7 to about 71.6. While specific embodiments of the invention have been shown and described, it is to be understood that the invention is not limited thereto, since modifications may be made and other embodiments of the general principals of the present invention may occur to those of skill in the art to which this invention pertains. Therefore, it is contemplated to cover any such modifications and other embodiments as may incorporate the features of this invention within the true spirit and scope of the following claims.

We claim:

1. An airbag cushion comprising a single fabric panel having substantially straight line geometry and including a shortest perimeter line segment and at least three other line segments and at least two substantially straight seams in order to connect at least three portions of said single fabric panel, wherein said airbag cushion forms a substantially flat inflatable side impact curtain cushion and possesses an assembly efficiency factor (AEF) defined as the product of the percent of total structural seam length which is straight multiplied by the percent material utilization divided by the total seam length in centimeters of about 21.7 to about 71.6, and wherein the length of each other perimeter line segment of said at least three other perimeter line segments is an integer multiple of said shortest perimeter line segment.

2. The airbag cushion of claim 1, wherein said airbag cushion possesses an assembly efficiency factor (AEF) of about 71.6.

3. The airbag cushion of claim 1, wherein said airbag cushion possesses an assembly efficiency factor (AEF) of about 35.4.

4. The airbag cushion of claim 1, wherein said airbag cushion possesses an assembly efficiency factor (AEF) of about 21.7.

5. The airbag cushion of claim 1, wherein at least three seams present within said airbag cushion are substantially straight.

6. The airbag cushion of claim 1, wherein said airbag cushion possesses an effective percent fabric utilization of about 90 to about 100.

7. The airbag cushion of claim 1, wherein said airbag cushion possesses an effective percent fabric utilization of about 95.

8. The airbag cushion of claim 1, wherein said airbag cushion possesses an effective percent fabric utilization of about 100.

9. The airbag cushion of claim 1, wherein said airbag cushion comprises a single fabric panel.

10. The airbag cushion of claim 9, wherein said single fabric panel is polygon shaped.

11. A vehicle restraint system comprising the airbag cushion of claim 1.

12. A vehicle restraint system comprising the airbag cushion of claim 2.

13. A vehicle restraint system comprising the airbag cushion of claim 5.

14. A vehicle restraint system comprising the airbag cushion of claim 6.

15. A vehicle restraint system comprising the airbag cushion of claim 10.

* * * * *